United States Patent [19]
Kajitani et al.

[11] Patent Number: 5,284,025
[45] Date of Patent: Feb. 8, 1994

[54] AIR CONDITIONING APPARATUS FOR AN ELECTRICALLY-POWERED MOTOR VEHICLE

[75] Inventors: Minoru Kajitani; Norio Yoshida, both of Moriyama, Japan

[73] Assignee: Matsushita Electric Industrial Co., Ltd., Osaka, Japan

[21] Appl. No.: 900,939

[22] Filed: Jun. 17, 1992

[30] Foreign Application Priority Data

Jun. 17, 1991 [JP] Japan ................................ 3-144466
Feb. 26, 1992 [JP] Japan ................................ 4-39114

[51] Int. Cl.$^5$ ............................................. F25B 13/00
[52] U.S. Cl. ........................................ 62/160; 62/186;
62/238.7; 62/244; 62/278; 62/324.5; 62/428; 62/454
[58] Field of Search ............... 62/160, 323.1, 180, 62/324.1, 324.5, 325, 238.6, 238.7, 244, 186, 428, 429, 452, 454, 455, 276, 278; 165/29, 42, 43

[56] References Cited

U.S. PATENT DOCUMENTS

| | | | |
|---|---|---|---|
| 2,272,302 | 2/1942 | Krackowizer | 62/276 |
| 4,527,400 | 7/1985 | Greenheck et al. | 62/428 X |
| 4,688,394 | 8/1987 | Waldorf | 62/244 X |
| 4,805,689 | 2/1989 | Inada et al. | 62/238.7 X |
| 4,991,405 | 2/1991 | Sakano | 62/428 X |

*Primary Examiner*—Harry B. Tanner
*Attorney, Agent, or Firm*—Wenderoth, Lind & Ponack

[57] ABSTRACT

An air conditioning system includes: a compressor, an outside air heat exchanger, an outside air heat exchanger fan, an expansion valve, an interior heat exchanger, an interior heat exchanger fan, and a four-way switching valve further comprises an outside air induction/venting device provided outside the outside air heat exchanger. A device for switching or opening/closing the air intakes and/or outlet of the outside air heat exchanger are provided in the outside air induction/venting device and are operated to enable the efficient use of waste heat from the drive shaft motor or inside the passenger compartment, and to provide a defrost cycle in the heat pump heating mode.

3 Claims, 13 Drawing Sheets

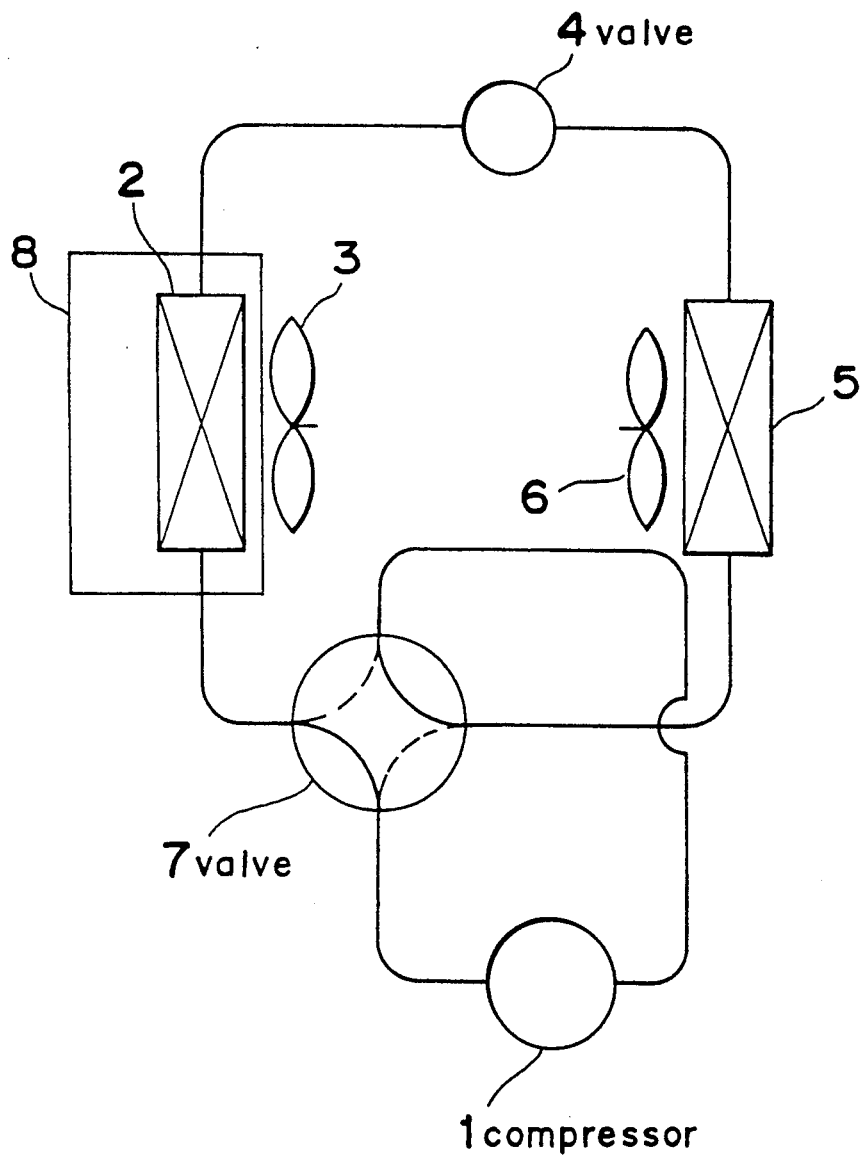

AIR CONDITIONING APPARATUS FOR AN ELECTRICALLY-POWERED MOTOR VEHICLE

BACKGROUND OF THE INVENTION

1. Field of the invention

The present invention relates to an apparatus for air conditioning the interior of an electrically-powered motor vehicle.

2. Prior art

An air conditioning system for a conventional internal combustion engine-driven motor vehicle is constructed as shown in FIG. 1 (a). A compressor 1 for compressing the coolant is driven by the engine; heat is discharged by the outside air heat exchanger 2 and the fan 3 for the outside air heat exchanger, and the coolant is condensed to a liquid. The condensed coolant is then transferred through an expansion valve 4 to the interior air heat exchanger 5 by which the air inside the passenger compartment is cooled, dehumidified, and the coolant vaporized by the interior air heat exchanger fan to cool the inside of the vehicle.

The passenger compartment is heated using the heat of the engine passing through a hot water heating coil.

An air conditioning apparatus for an electrically-powered motor vehicle cooling can be provided by an essentially similar system, but the engine heat is not present and therefore cannot be used for heating. It is therefore necessary to modify the section indicated by the dotted line in FIG. 1 (a) as shown in FIG. 1 (b) to form a heat pump heating system. A four-way switching valve 7 downstream from the compressor 1 reverses the coolant flow so that the heat from the interior air heat exchanger 5 is discharged into the passenger compartment and the coolant is condensed. The condensed coolant is then passed through the expansion valve 4 to the outside air heat exchanger 2, which then cools and dehumidifies the air outside the vehicle so that the coolant absorbs heat and is again vaporized.

It should be noted that a heat pump heat system using engine waste heat in an air conditioning system for an internal combustion engine-driven vehicle has also been described in Japanese patent Application Publication (unexamined) H3-90430.

Because the coolant in the outside air heat exchanger reaches a low temperature when this system is operating in the heat pump heating mode, the moisture absorbed from the air tends to condense as frost or ice on the outside air heat exchanger, thus preventing the outside air heat exchanger from exchanging heat with the air. It is therefore necessary to provide a defrost cycle for the outside air heat exchanger.

In a residential room air conditioner this defrost cycle is accomplished by switching the four-way switching valve to the cooling mode position, effectively raising the temperature of and defrosting the outside air heat exchanger. The outside air heat exchanger fan is also stopped during the defrost cycle because defrosting is not possible if the outside air heat exchanger is exchanging heat with the air. This same cycle is applied for outside air heat exchanger defrosting in a motor vehicle with a heat pump heating mode.

In an electrically-powered motor vehicle, however, a supplemental heat source must be provided because waste heat from the engine is not available. The natural air flow of vehicle movement causes air to pass through the outside air heat exchanger even when the outside air heat exchanger fan is stopped. The outside air heat exchanger therefore continues to exchange heat with the air, and defrosting in the heat pump heating mode becomes impossible.

SUMMARY OF THE INVENTION

Therefore, an object of the present invention is to enable the effective use of another heat source enabling a defrost cycle in the heat pump heating mode when the vehicle is moving.

Specifically, the present invention relates to an air conditioning apparatus for an electrically-powered motor vehicle comprising a first air duct through which travels air that has passed the drive shaft motor, a second air duct through which travels air from outside the vehicle, and a switching means provided at the air intake section of the outside air heat exchanger for switching the two air ducts.

By selectively switching the air supply between two air ducts, the present invention enables the outside air heat exchanger to use waste heat from the drive shaft motor during the heat pump heating mode, and air from outside the vehicle during the cooling mode.

An alternative embodiment of the invention comprises an air duct connected to the air intake section of the outside air heat exchanger, and an outside air heat exchanger fan and a switch device for opening and closing this air duct.

By opening and closing the air duct to the air intake of the outside air heat exchanger and stopping the outside air heat exchanger fan, the flow of air can be stopped to the front of the outside air heat exchanger, and an outside air heat exchanger defrost cycle can be achieved in the heat pump heating mode when the vehicle is in motion.

An alternative means of achieving the objectives of the invention comprises a first air duct through which travels air that has passed the drive shaft motor and passes the outside air heat exchanger fan, a second air duct through which travels air from outside the vehicle, a switch device provided at the air intake section of the outside air heat exchanger for opening and closing the two air ducts, and a control means for opening the first air duct and closing the second air duct during the heating mode, closing the first air duct and opening the second air duct during the cooling mode, and closing both the first and second air ducts and stopping the outside air heat exchanger fan during the defrost cycle of the heating mode.

By controlling the opening of the two air ducts and the operation of the outside air heat exchanger fan according to the operating mode of the air conditioning system, the outside air heat exchanger can use the waste heat of the drive shaft motor during the heat pump heating mode, can introduce fresh air from outside the vehicle in the cooling mode, and can enable a defrost cycle in the heat pump heating mode because the air flow to the front of the outside air heat exchanger can be stopped during vehicle travel.

An alternative means of achieving the objectives of the invention comprises a first air duct through which travels air that has passed the drive shaft motor and passes the outside air heat exchanger fan, a second air duct through which travels air from outside the vehicle, a first temperature detection means inside the first air duct and a second temperature detection means inside the second air duct, a switch device provided at the air intake section of the outside air heat exchanger for opening and closing the two air ducts, and a control means for comparing the temperatures of the first and second air ducts and opening the high temperature air duct and closing the low temperature air duct during the heating mode, comparing the temperatures of the first and second air ducts and opening the low temperature air duct and closing the high temperature air duct during the cooling mode, opening both the first and second air ducts during the heating and cooling modes when the temperature difference is within a predetermined threshold value due to some other factor such as the drive shaft motor being stopped, and closing both the first and second air ducts and stopping the outside air heat exchanger fan during the defrost cycle of the heating mode.

By controlling the opening of the two air ducts and the operation of the outside air heat exchanger fan according to the operating mode of the air conditioning system and the temperature difference between the two temperature detection means, the outside air heat exchanger can use the higher temperature air duct during the heat pump heating mode, can use the lower temperature air duct in the cooling mode, and can adapt to a reversal of temperatures in the air ducts due to external conditions such as the radiant heat of the sun because the air duct selection is temperature controlled. In addition, when the temperature difference is below a predetermined threshold value such as when the vehicle is stopped, the two air ducts can be used to lower the resistance of the air duct and increase the air flow through the outside air heat exchanger. In addition, a defrost cycle can be enabled in the heat pump heating mode because the air flow to the front of the outside air heat exchanger can be stopped during vehicle travel.

An alternative embodiment of the invention comprises a switching means for opening and closing the air duct to the air intake section of the outside air heat exchanger, a switch device for opening and closing the air duct to the air outlet section of the outside air heat exchanger, and an outside air heat exchanger fan.

A defrost cycle in the heat pump heating mode can thus be enabled during vehicle travel even when there is a draft behind the outside air heat exchanger because the supply of outside air to the outside air heat exchanger can be completely shut off by opening and closing the air ducts to the air intake and from the outlet of the outside air heat exchanger.

An alternative means of achieving the objectives of the invention comprises a first air duct through which travels air that has passed the drive shaft motor and passes the outside air heat exchanger fan, a second air duct through which travels air from outside the vehicle, a switching means provided at the air intake section of the outside air heat exchanger for switching the first and second air ducts, a switch device provided in the air outlet of the outside air heat exchanger for opening and closing a third air duct, and a control means for opening the first and third air ducts and closing the second air duct during the heating mode, closing the first and third air ducts and opening the second air duct during the cooling mode, and closing the first, second, and third air ducts and stopping the outside air heat exchanger fan during the defrost cycle of the heating mode.

By controlling the opening of the three air ducts and the operation of the outside air heat exchanger fan according to the operating mode of the air conditioning system, the outside air heat exchanger can use the waste heat of the drive shaft motor during the heat pump heating mode, can introduce fresh air from outside the vehicle in the cooling mode, and can enable a defrost cycle in the heat pump heating mode even when there is a draft behind the outside air heat exchanger because the supply of outside air to the outside air heat exchanger can be completely shut off.

An alternative means of achieving the objectives of the invention comprises a first air duct through which travels air that has passed the drive shaft motor and passes the outside air heat exchanger fan, a second air duct through which travels air from outside the vehicle, a first temperature detection means inside the first air duct and a second temperature detection means inside the second air duct, a switch device provided at the air intake section of the outside air heat exchanger for opening and closing the first and second air ducts, a switch device provided in the air outlet of the outside air heat exchanger for opening and closing a third air duct, and a control means for comparing the temperatures of the first and second air ducts and opening the air duct with the higher temperature and the third air duct and closing the low temperature air duct during the heating mode, comparing the temperatures of the first and second air ducts and opening the air duct with the lower temperature and the third air duct and closing the high temperature air duct during the cooling mode, opening the first, second, and third air ducts during the heating and cooling modes when the temperature difference is within a predetermined threshold value due to some other factor such as the drive shaft motor being stopped, and closing the first, second, and third air ducts and stopping the outside air heat exchanger fan during the defrost cycle of the heating mode.

By controlling the opening of the three air ducts and the operation of the outside air heat exchanger fan according to the operating mode of the air conditioning system and the temperature difference between the two temperature detection means, the outside air heat exchanger can use the higher temperature air duct during the heat pump heating mode, can use the lower temperature air duct in the cooling mode, and can adapt to a reversal of temperatures in the air ducts due to external conditions such as the radiant heat of the sun because the air duct selection is temperature controlled. In addition, when the temperature difference is below a predetermined threshold value such as when the vehicle is stopped, two air ducts can be used to lower the resistance of the air duct and increase the air flow through the outside air heat exchanger. In addition, a defrost cycle can be enabled in the heat pump heating mode even when there is a draft behind the outside air heat exchanger because the supply of outside air to the outside air heat exchanger can be completely shut off.

An alternative means of achieving the objectives of the invention comprises a first air duct through which travels air vented from the passenger compartment, a second air duct through which travels air from outside the vehicle, a switching means provided at the air intake to the outside air heat exchanger for switching the two air ducts, and a control means for switching to the first air duct during the heating mode, switching to the second air duct during the cooling mode, and switching to the first air duct and stopping the outside air heat exchanger fan and the interior air heat exchanger fan during the defrost cycle of the heating mode.

By controlling the switching of the two air ducts and the operation of the fans for the interior and outside air heat exchangers according to the operating mode of the air conditioning system, the outside air heat exchanger can use the waste heat in the air vented from the passenger compartment during the heat pump heating mode, can directly intake outside air in the cooling mode, and a defrost cycle can be enabled in the heat pump heating mode because the air flow to the front of the outside air heat exchanger can be stopped during vehicle travel.

An alternative means of achieving the objectives of the invention comprises a first air duct through which travels air vented from the passenger compartment and passes through from the outside air heat exchanger fan, a second air duct through which travels air from outside the vehicle, a switch device provided at the air intake to the outside air heat exchanger for opening and closing the two air ducts, and a control means for opening the first air duct and closing the second air duct during the heating mode, closing the first air duct and opening the second air duct during the cooling mode, and closing the first and second air ducts and stopping the outside air heat exchanger fan during the defrost cycle of the heating mode.

By controlling the opening of the two air ducts and the operation of the outside air heat exchanger fan according to the operating mode of the air conditioning system, the outside air heat exchanger can use the waste heat in the air vented from the passenger compartment during the heat pump heating mode, can directly intake outside air in the cooling mode, and a defrost cycle can be enabled in the heat pump heating mode because the air flow to the front of the outside air heat exchanger can be stopped during vehicle travel.

An alternative means of achieving the objectives of the invention comprises a first air duct through which travels air vented from the passenger compartment and passing through the outside air heat exchanger fan, a second air duct through which travels air from outside the vehicle, a switch device provided at the air intake to the outside air heat exchanger for opening and closing the two air ducts, a third air duct provided at the air outlet of the outside air heat exchanger, a switch device for opening and closing the third air duct, and a control means for opening the first and third air ducts and closing the second air duct during the heating mode, closing the first air duct and opening the second and third air ducts during the cooling mode, and closing the first, second, and third air ducts and stopping the outside air heat exchanger fan during the defrost cycle of the heating mode.

By controlling the opening of the three air ducts and the operation of the outside air heat exchanger fan according to the operating mode of the air conditioning system, the outside air heat exchanger can use the waste heat in the air vented from the passenger compartment during the heat pump heating mode, can directly intake outside air in the cooling mode, and a defrost cycle can be enabled in the heat pump heating mode even when there is a draft behind the outside air heat exchanger because the supply of outside air to the outside air heat exchanger can be completely shut off.

BRIEF DESCRIPTION OF THE DRAWINGS

The present invention will become more fully understood from the detailed description given below and the accompanying diagrams wherein:

FIG. 1 (b) is a diagram of a conventional air conditioning system for an electric automobile;

FIG. 2 is a diagram of an air conditioning system for an electric automobile according to the present invention;

DESCRIPTION OF PREFERRED EMBODIMENTS

Figure 1A:
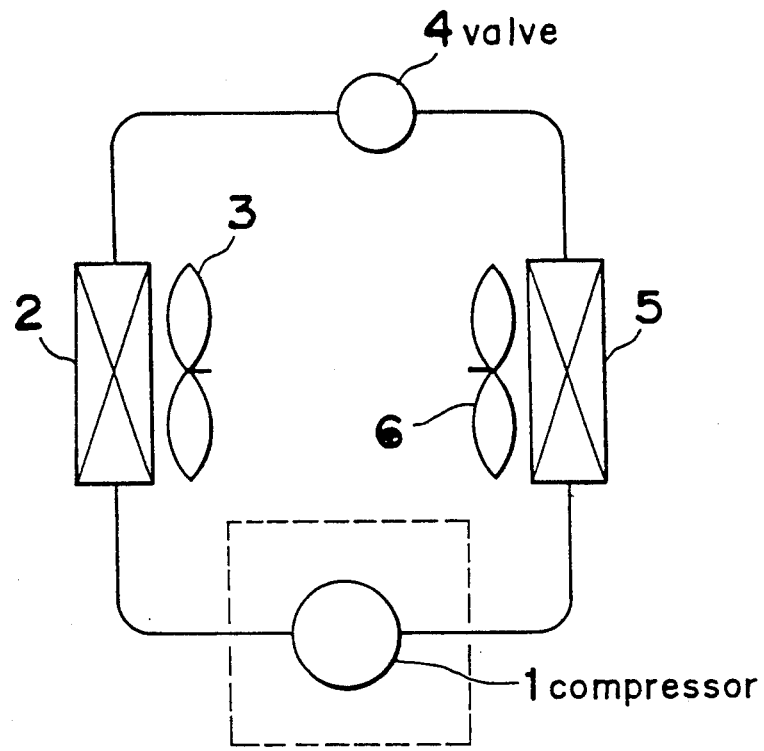
FIG. 1 (a) is a diagram of a conventional air conditioning system for an internal combustion engine-driven automobile.
Figure 1B:
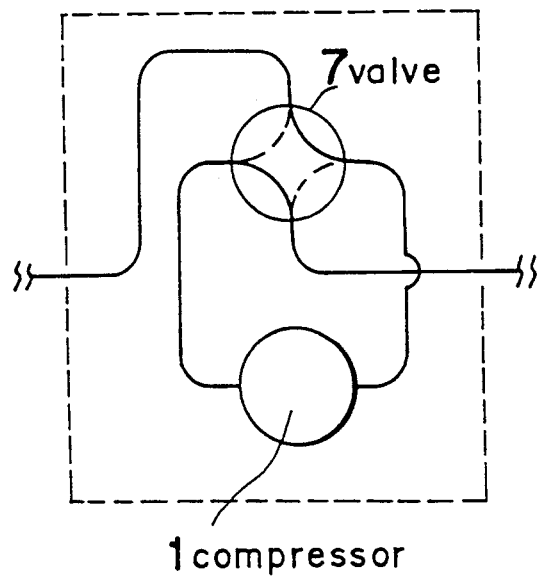

The preferred embodiments of an air conditioning apparatus for an electrically-powered motor vehicle according to the present invention are described below with reference to the accompanying figures, of which FIG. 2 shows the air conditioning system according to the first embodiment.

As shown in FIG. 2, this air conditioning system comprises a compressor 1, an outside air heat exchanger 2, an outside air heat exchanger fan 3, an expansion valve 4, an interior air heat exchanger 5, an interior air heat exchanger fan 6, a four-way switching valve 7, and an outside air induction/venting means 8 of the invention, which is provided outside the outside air heat exchanger 2. The coolant flow is the same in the invention as in the conventional apparatus described above, and a further description thereof has been omitted below.

It is necessary for all of the components to feature a high efficiency, low power consumption design because of the limited capacity of the battery in an electrically powered motor vehicle.

Figure 3:
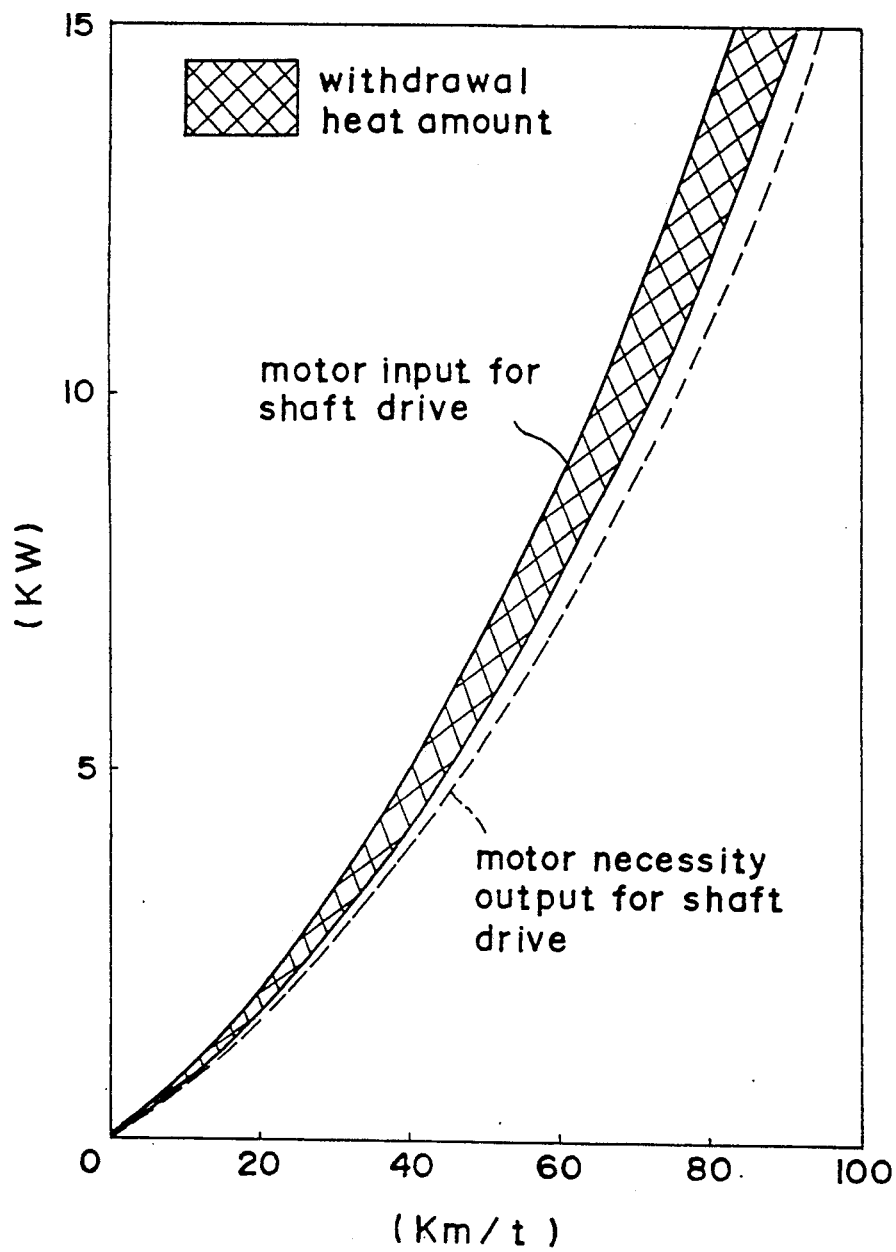
FIG. 3 is a graph of the amount of waste heat recovered from the vehicle drive motor at different vehicle speeds.

FIG. 3 is a graph showing the amount of waste heat typically recoverable from the drive motor of an electric car.

If the gross weight, including the battery, of a compact electric car is assumed to be 2000 kg, the motor output required to travel 40 km/hr on a level road will be 4 kW, and 11 kW when travelling 80 km/hr. If the motor is assumed to be 80% efficient, the respective input power required will be 5 kW and 14 kW. The heat generated by the motor will be the difference between the input power and the output power. If 70% of this waste heat can be recovered, it will be possible to recover 0.7 kW (600 kcal/hr) and 2.1 kW (1800 kcal/hr), respectively. This heat recovery is shown as the shaded area between the input (solid line) and output (dotted line) in FIG. 3.

The following embodiment of the invention effectively utilizes another heat source.

Figure 4:
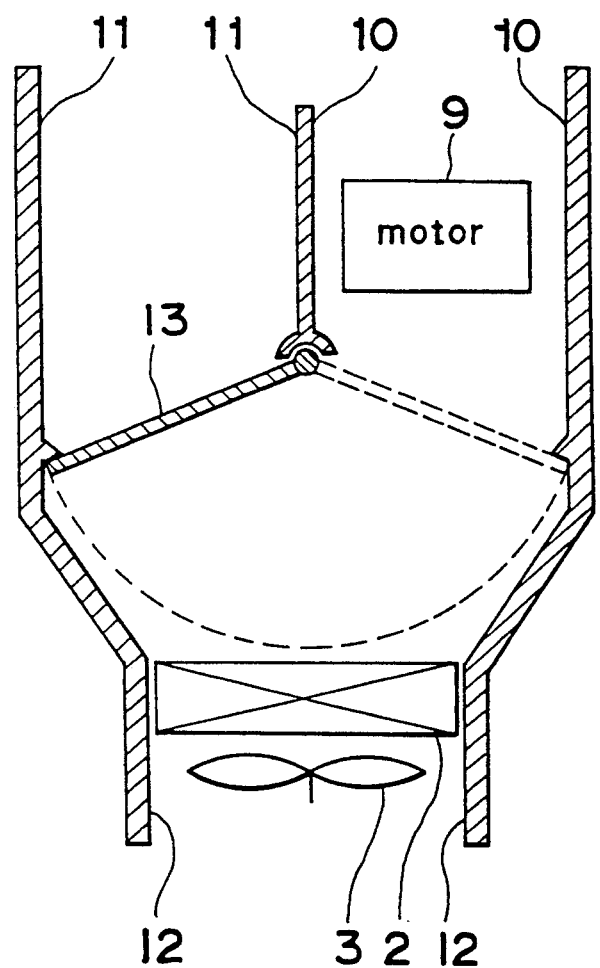
FIG. 4 is a cross-section of the outside air induction device for the air conditioning apparatus for an electrically-powered motor vehicle according to the present invention.

FIG. 4 is a cross-section of the first embodiment of the outside air induction/venting means 8 used in the system shown in FIG. 2.

As shown in FIG. 4, the drive shaft motor 9 is surrounded by a duct 10 which intakes outside air passed around the drive shaft motor 9. The other intake duct 11 intakes air directly from the outside. Both intake ducts 10 and 11 are connected so that the air from both flows into a common duct 12. A damper 13 is placed at the connection of the three ducts 10, 11, and 12 to control the flow of air from either duct 10 or duct 11 into the common duct 12. The outside air heat exchanger 2 and the outside air heat exchanger fan 3 are placed inside the common duct 12 of the outside air induction/venting means 8 constructed as shown in FIG. 4.

When operating in the heating mode, the damper 13 is positioned as shown in FIG. 4 in the outside air induction/venting means 8 so that outside air warmed by the waste heat of the drive shaft motor 9 is introduced to the outside air heat exchanger 2. During the cooling mode, the damper 13 is switched to the position indicated by the dotted line in FIG. 4 so that the outside air is introduced directly to the outside air heat exchanger 2 without being warmed. By thus changing the position of the damper 13, waste heat from the drive shaft motor 9 can be used in the heating mode to improve heating capacity and efficiency, and decreased cooling capacity and efficiency caused by an increase in the air temperature from the waste heat can be prevented in the cooling mode by direct ducting of outside air.

The object of the second embodiment of the invention is to enable a defrost cycle in the heat pump heating mode.

Figure 5A:
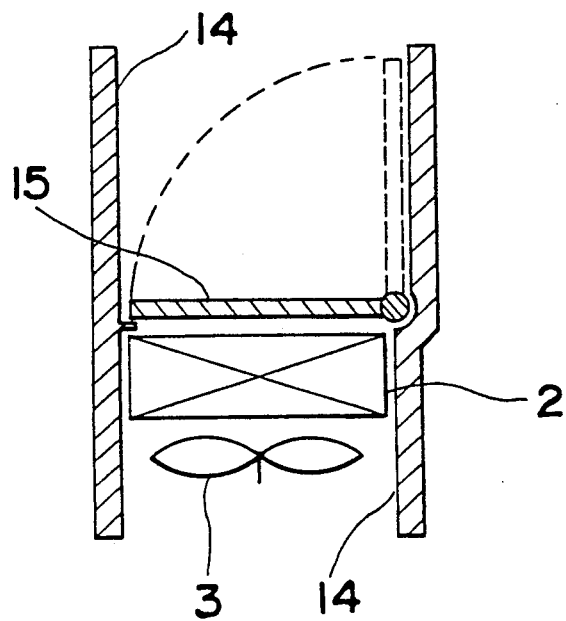
FIGS. 5 (a) and 5(b) are cross-sections of the outside air induction device for the air conditioning apparatus of an electrically-powered motor vehicle according to a second embodiment of the present invention.
Figure 5B:
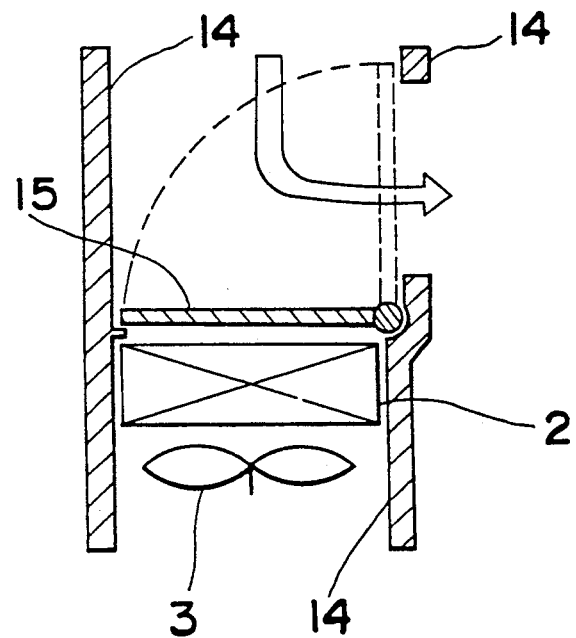

FIG. 5 (a) is a cross-section of the second embodiment of the outside air induction/venting means 8 used in the system shown in FIG. 2.

As shown in FIG. 5 (a), the damper 15 is placed in the duct 14 to open and close the flow of air from the duct 14 to the outside air heat exchanger 2, which is also provided inside the duct 14 together with the outside air heat exchanger fan 3.

With this outside air induction/venting means 8, the flow of air into the outside air heat exchanger 2 can be prevented by closing the damper 15 and stopping the outside air heat exchanger fan 3, thus enabling a defrost cycle in the heating mode during normal vehicle travel.

It is to be noted that the same effect can be obtained by substituting an aperture-like flow restrictor for the damper switch device to greatly restrict the air flow.

By further providing a hole in the duct 14 as shown in FIG. 5 (b), the air flow can be allowed to escape when the damper 15 is closed, reducing the leakage of air passing the closed damper 15 and further improving efficiency.

The object of the third embodiment of the invention is to enable the efficient use of another heat source and a defrost cycle in the heat pump heating mode.

Figure 6:
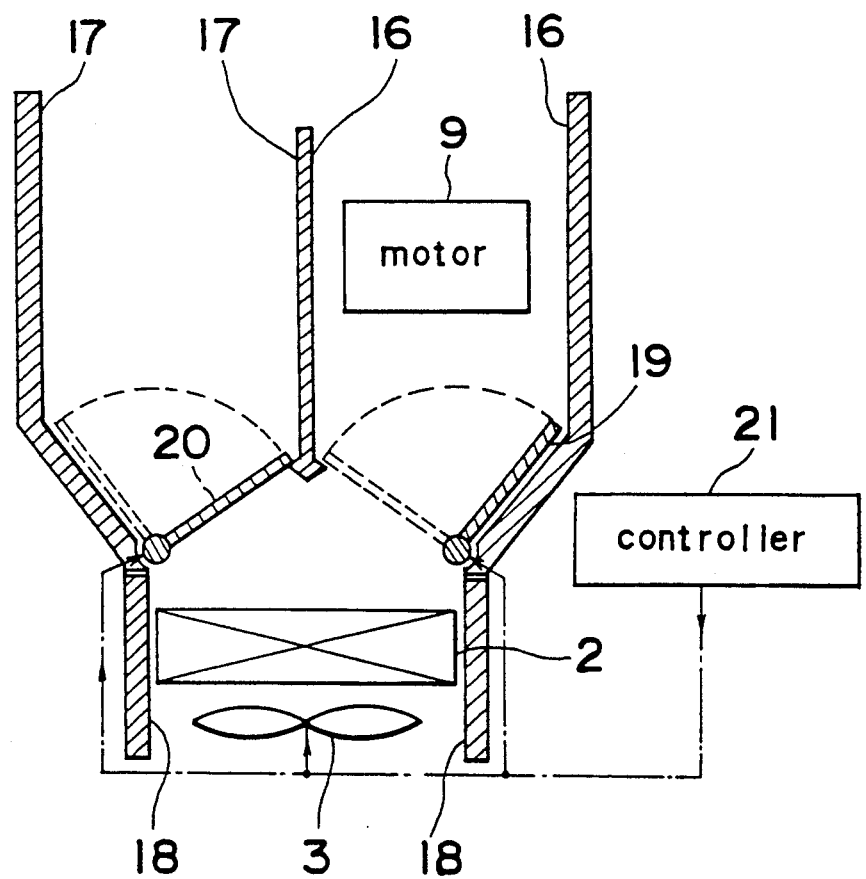
FIG. 6 is a cross-section of the outside air induction device for the air conditioning apparatus of an electrically-powered motor vehicle according to a third embodiment of the present invention.

FIG. 6 is a cross-section of the third embodiment of the outside air induction/venting means 8 used in the system shown in FIG. 2.

As shown in FIG. 6, the drive shaft motor 9 is surrounded by a duct 16 which intakes outside air passed around the drive shaft motor 9. The other intake duct 17 intakes air directly from the outside. Both intake ducts 16 and 17 are connected so that the air from both flows into a common duct 18. Separate dampers 19 and 20 are placed between ducts 16 and 18, and 17 and 18, respectively, to control the flow of air from either duct 16 or duct 17 into the common duct 18. The outside air heat exchanger 2 and the outside air heat exchanger fan 3 are placed inside the common duct 18 of the outside air induction/venting means 8 constructed as shown in FIG. 6. A control device 21 is also externally provided to control the position (open or closed) of the dampers 19 and 20 and the operating state of the outside air heat exchanger fan 3 according to the air conditioning mode.

With this outside air induction/venting means 8, damper 19 is closed and damper 20 is opened to allow the direct flow of outside air to the outside air heat exchanger 2 when operating in the cooling mode. When operating in the heating mode, damper 19 is opened and damper 20 is closed so that outside air warmed by the waste heat of the drive shaft motor 9 is introduced to the outside air heat exchanger 2. During the defrost cycle of the heating mode, both dampers 19 and 20 are closed and the outside air heat exchanger fan 3 is stopped. By thus changing the position of the dampers and outside air heat exchanger fan 3 operation according to the air conditioning mode, waste heat from the drive shaft motor 9 can be used in the heating mode to improve heating capacity and efficiency, and decreased cooling capacity and efficiency caused by an increase in the air temperature from the waste heat can be prevented in the cooling mode. In addition, a defrost cycle can be enabled in the heating mode during normal vehicle travel because the flow of air into the outside air heat exchanger 2 can be stopped.

Figure 7:
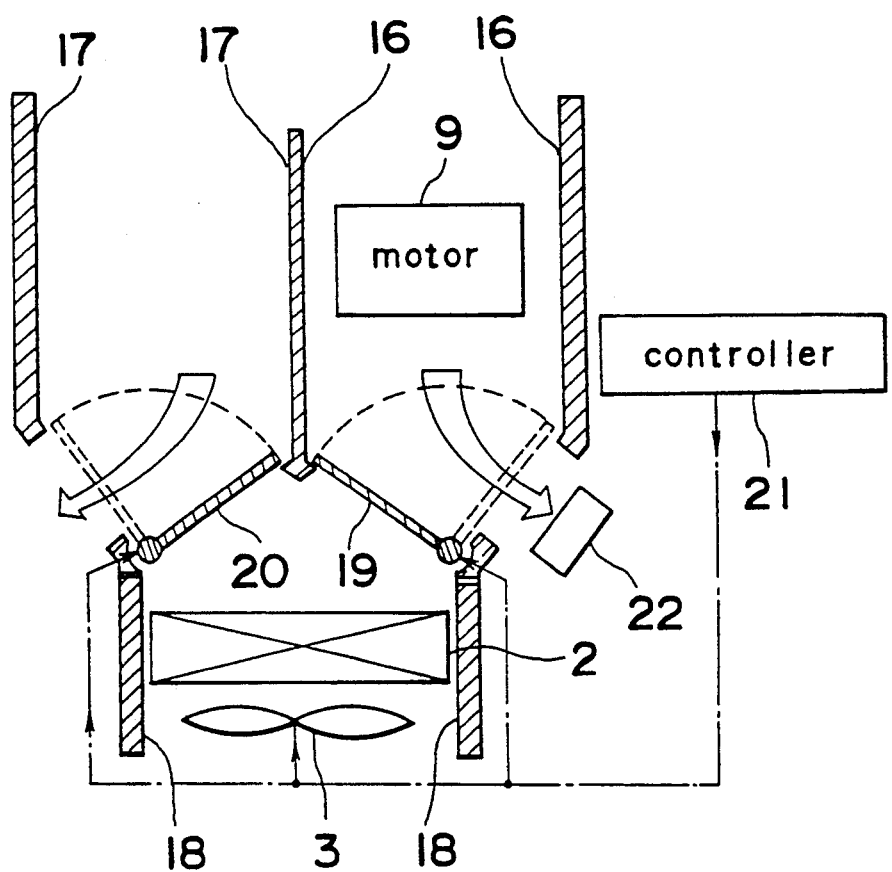
FIG. 7 is a cross-section showing a different state of the outside air induction device for the air conditioning apparatus of an electrically-powered motor vehicle according to a third embodiment of the present invention.

By further providing a hole in either duct 16 or 17 as shown in FIG. 7, the air flow can be allowed to escape when the damper is closed, reducing the leakage of air passing the closed damper and further improving efficiency. These vents can also be used for cooling the drive shaft motor 9 in hot weather. In addition, by placing the windshield washer fluid tank or other auxiliary unit 22 downstream from the air vented from the drive shaft motor 9 duct 16, waste heat from the motor can be used to prevent fluid freezing and other problems in winter and low temperature areas when the waste heat is not needed by the outside air heat exchanger 2.

The object of the next embodiment of the invention is to enable the efficient use of another heat source and a defrost cycle in the heat pump heating mode.

Figure 8:
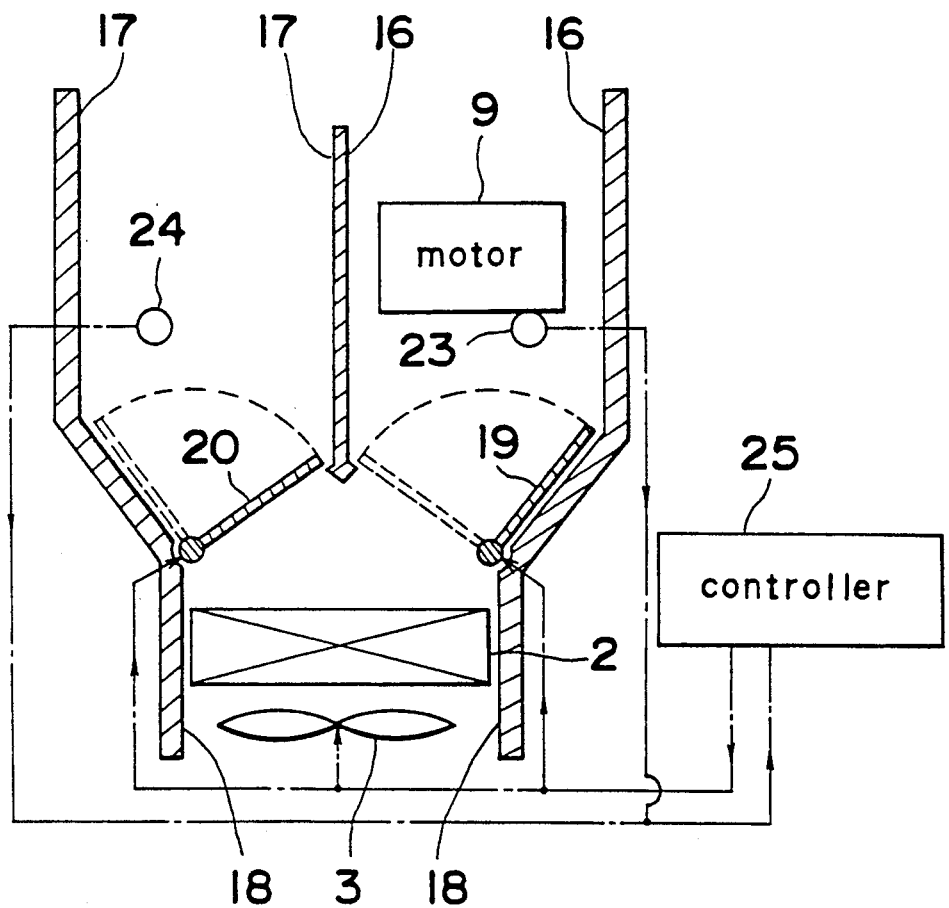
FIG. 8 is a cross-section of the outside air induction device for the air conditioning apparatus of an electrically-powered motor vehicle according to a fourth embodiment of the present invention.

FIG. 8 is a cross-section of an embodiment of the outside air induction/venting means 8 used in the system shown in FIG. 2.

The outside air heat exchanger 2, outside air heat exchanger fan 3, drive shaft motor 9, ducts 16, 17, and 18, and dampers 19 and 20 shown in FIG. 8 are the same as those shown in FIG. 6, and a further description thereof has been omitted.

This embodiment is characterized by the temperature detector 23 provided inside the drive shaft motor 9 duct 16, the temperature detector 24 provided in the other duct 17, and the control device 25 provided outside the ducts to control opening and closing of the dampers 19 and 20 and outside air heat exchanger fan 3 operation according to the air conditioning mode and the difference between the temperature of the two ducts as detected by the two temperature detectors 23 and 24.

With this outside air induction/venting means 8, the temperature of the air in duct 16 and is compared with that of duct 17 based on the temperature detectors 23 and 24. The two dampers 19 and 20 are then controlled so that the lower temperature duct is opened and the higher temperature duct is closed in the cooling mode, and the higher temperature duct is opened and the lower temperature duct closed in the heating mode. Furthermore, when the temperature difference between the two ducts 16 and 17 is within a predetermined threshold value in either the heating or cooling mode because, for example, the drive shaft motor 9 is stopped, both dampers 19 and 20 are opened. In addition, both dampers 19 and 20 are closed and the outside air heat exchanger fan 3 is stopped during the heating mode defrost cycle.

By thus changing the position of the dampers and outside air heat exchanger fan 3 operation according to the air conditioning mode, waste heat from the drive shaft motor 9 can be used in the heating mode to improve heating capacity and efficiency, and decreased cooling capacity and efficiency caused by an increase in the air temperature from the waste heat can be prevented in the cooling mode by direct ducting of outside air. In addition, a defrost cycle can be enabled in the heating mode during normal vehicle travel because the flow of air into the outside air heat exchanger 2 can be stopped. The air flow to the outside air heat exchanger 2 can also be increased when the vehicle is stopped and at other times by using both ducts.

The object of the next embodiment of the invention is to enable a defrost cycle in the heat pump heating mode during vehicle travel.

Figure 9:
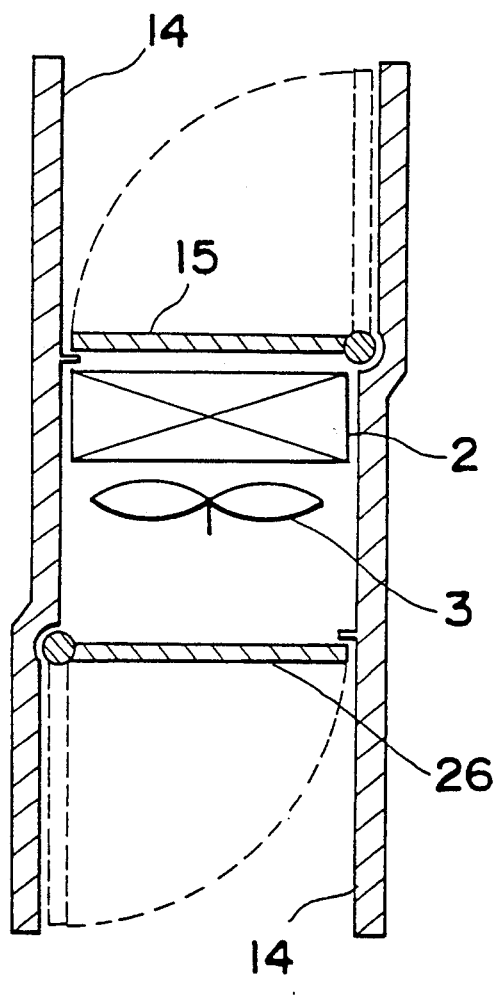
FIG. 9 is a cross-section of the outside air induction device for the air conditioning apparatus of an electrically-powered motor vehicle according to a fifth embodiment of the present invention.

FIG. 9 is a cross-section of an embodiment of the outside air induction/venting means 8 used in the system shown in FIG. 2.

The positions of the outside air heat exchanger 2, outside air heat exchanger fan 3, duct 14, and damper 15 in the embodiment shown in FIG. 9 are the same as those of the embodiment shown in FIG. 5 (a).

This embodiment is characterized by an additional damper 26 provided in the duct 14 on the vent side of the outside air heat exchanger 2.

With this outside air induction/venting means 8, a defrost cycle can be provided in the heating mode during vehicle travel by cutting off the supply of air to the front of the outside air heat exchanger 2 and any draw caused by drag behind the outside air heat exchanger 2 during vehicle travel by closing both dampers 15 and 26 and stopping the outside air heat exchanger fan 3.

It is to be noted that this damper 26 is shown on the vent side of the outside air heat exchanger fan 3 in FIG. 9, but the same effect can be obtained by placing the damper 26 between the outside air heat exchanger 2 and the outside air heat exchanger fan 3 so long as the outside air heat exchanger 2 is enclosed between the two dampers 15 and 26.

By further providing a hole in the inlet side of the duct 14 as shown in FIG. 5 (b), the air flow can be allowed to escape when the damper 15 is closed, reducing the leakage of air passing the closed damper 15 and further improving efficiency.

The object of the next embodiment of the invention is to enable the efficient use of another heat source and a defrost cycle in the heat pump heating mode.

Figure 10:
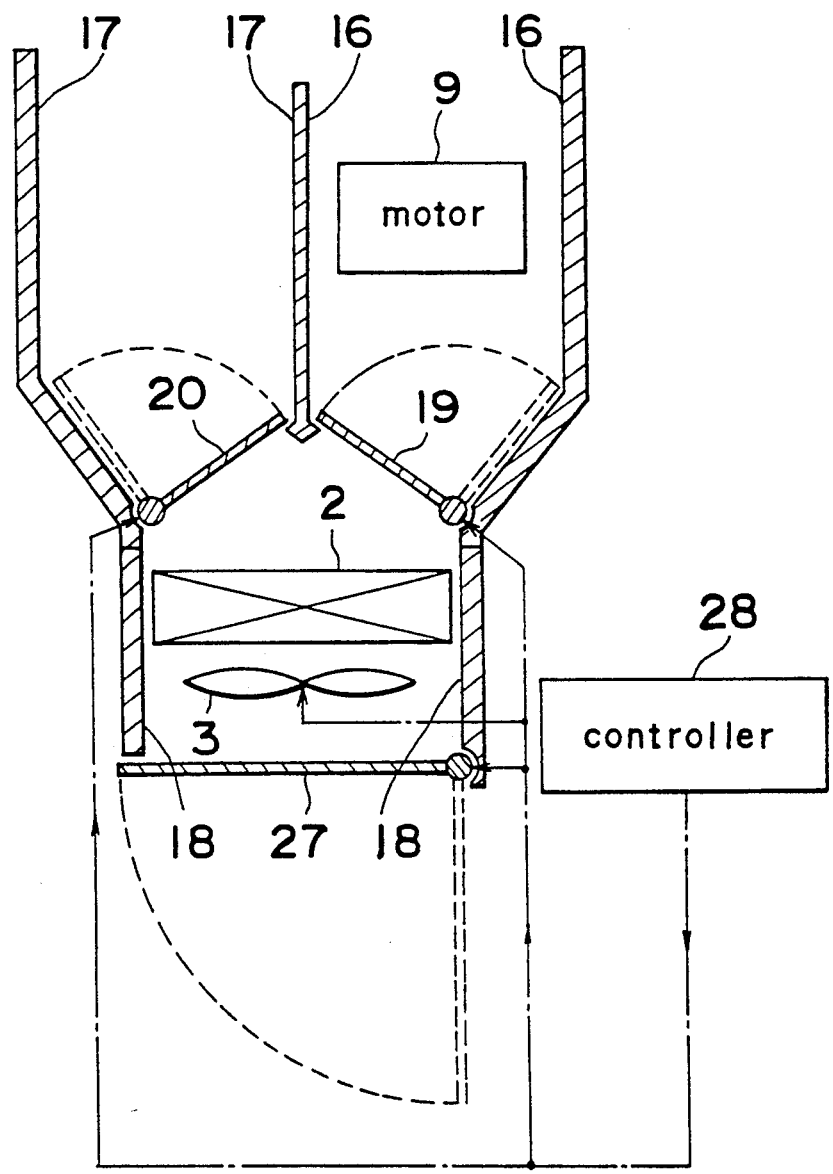
FIG. 10 is a cross-section of the outside air induction device for the air conditioning apparatus of an electrically-powered motor vehicle according to a sixth embodiment of the present invention.

FIG. 10 is a cross-section of an embodiment of the outside air induction/venting means 8 used in the system shown in FIG. 2.

The outside air heat exchanger 2, outside air heat exchanger fan 3, drive shaft motor 9, ducts 16, 17, and 18, and dampers 19 and 20 are the same as those of the embodiment shown in FIG. 6.

This embodiment is characterized by an additional damper 27 provided in the duct 18 on the vent side of the outside air heat exchanger 2, and a control device 28 to control the position (open or closed) of the dampers 19, 20, and 27 and the operating state of the outside air heat exchanger fan 3 according to the air conditioning mode.

With this outside air induction/venting means 8, damper 19 is closed and dampers 20 and 27 are opened to allow the direct flow of outside air to the outside air heat exchanger 2 when operating in the cooling mode. When operating in the heating mode, dampers 19 and 27 are opened and damper 20 is closed so that outside air warmed by the waste heat of the drive shaft motor 9 is introduced to the outside air heat exchanger 2. During the defrost cycle of the heating mode, dampers 19, 20, and .27 are closed and the outside air heat exchanger fan 3 is stopped. By thus changing the position of the dampers and outside air heat exchanger fan 3 operation according to the air conditioning mode, waste heat from the drive shaft motor 9 can be used in the heating mode to improve heating capacity and efficiency, and decreased cooling capacity and efficiency caused by an increase in the air temperature from the waste heat can be prevented in the cooling mode. In addition, a defrost cycle can be enabled in the heating mode during normal vehicle travel because the flow of air into the outside air heat exchanger 2 can be stopped and any draw caused by drag behind the outside air heat exchanger 2 during vehicle travel can be blocked.

By further providing a hole in either duct 16 or 17 as shown in FIG. 7, the air flow can be allowed to escape when the damper is closed, reducing the leakage of air passing the closed damper and further improving efficiency. These vents can also be used for cooling the drive shaft motor 9 in hot weather. In addition, by placing the windshield washer fluid tank or other auxiliary unit 22 downstream from the air vented from the drive shaft motor 9 duct 16, waste heat from the motor can be used to prevent fluid freezing and other problems in winter and low temperature areas when the waste heat is not needed by the outside air heat exchanger 2.

It is to be noted that this damper 27 is shown on the vent side of the outside air heat exchanger fan 3 in FIG. 10, but the same effect can be obtained by placing the damper 26 between the outside air heat exchanger 2 and the outside air heat exchanger fan 3.

The object of the embodiment of the invention is to enable the efficient use of another heat source and a defrost cycle in the heat pump heating mode during vehicle travel.

Figure 11:
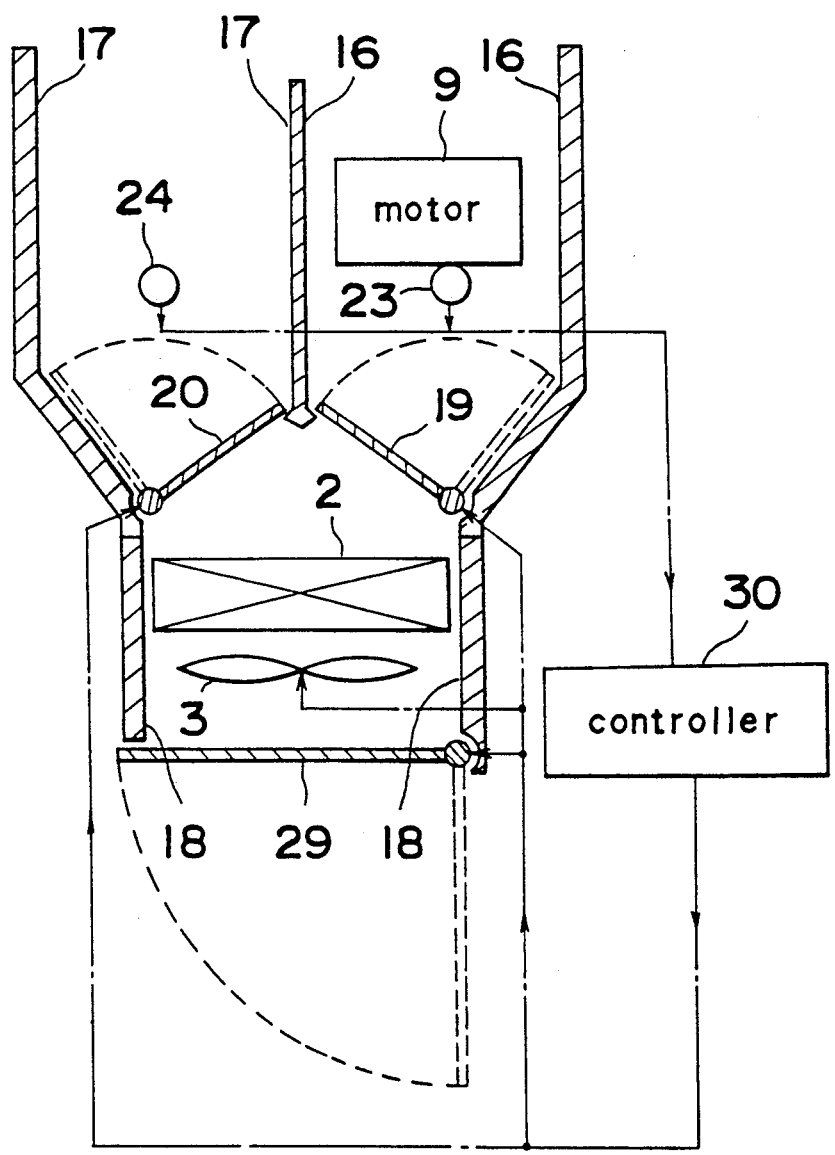
FIG. 11 is a cross-section of the outside air induction device for the air conditioning apparatus of an electrically-powered motor vehicle according to a seventh embodiment of the present invention.

FIG. 11 is a cross-section of an embodiment of the outside air induction/venting means 8 used in the system shown in FIG. 2.

The outside air heat exchanger 2, outside air heat exchanger fan 3, drive shaft motor 9, ducts 16, 17, and 18, and temperature detectors 23 and 24 in the dampers 19 and 20 shown in FIG. 11 are the same as those shown in FIG. 8, and a further description thereof has been omitted.

This embodiment is characterized by the damper 29 provided on the vent side of the outside air heat exchanger 2, and a control device 30 to control the position (open or closed) of the dampers 19, 20, and 29 and the operating state of the outside air heat exchanger fan 3 according to the air conditioning mode and the difference between the temperature of the two ducts as detected by the two temperature detectors 23 and 24.

With this outside air induction/venting means 8, the temperature of the air in duct 16 and is compared with that of duct 17 based on the temperature detectors 23 and 24. The two dampers 19 and 20 are then controlled so that the lower temperature duct is opened, the higher temperature duct is closed, and the vent duct 29 is opened in the cooling mode, and the higher temperature duct is opened, the lower temperature duct closed, and the vent duct 29 is opened in the heating mode. Furthermore, when the temperature difference between the two ducts 16 and 17 is within a predetermined threshold value in either the heating or cooling mode because, for example, the drive shaft motor 9 is stopped, dampers 19, 20, and 29 are opened. In addition, both dampers 19, 20, and 29 are closed and the outside air heat exchanger fan 3 is stopped during the heating mode defrost cycle.

By thus changing the position of the dampers and outside air heat exchanger fan 3 operation according to the air conditioning mode, waste heat from the drive shaft motor 9 can be used in the heating mode to improve heating capacity and efficiency, and decreased cooling capacity and efficiency caused by an increase in the air temperature from the waste heat can be prevented in the cooling mode. In addition, a defrost cycle can be enabled in the heating mode during normal vehicle travel because the flow of air into and draft caused by drag behind the outside air heat exchanger 2 can be stopped. The air flow to the outside air heat exchanger 2 can also be increased when the vehicle is stopped and at other times by using both ducts.

It is to be noted that this damper 29 is shown on the vent side of the outside air heat exchanger fan 3 in FIG. 11, but the same effect can be obtained by placing the damper 29 between the outside air heat exchanger 2 and the outside air heat exchanger fan 3.

By further providing a hole in either duct 16 or 17 as shown in FIG. 7, the air flow can be allowed to escape when the damper is closed, reducing the leakage of air passing the closed damper and further improving efficiency. These vents can also be used for cooling the drive shaft motor 9 in hot weather. In addition, by placing the windshield washer fluid tank or other auxiliary unit 22 downstream from the air vented from the drive shaft motor 9 duct 16, waste heat from the motor can be used to prevent fluid freezing and other problems in winter and low temperature areas when the waste heat is not needed by the outside air heat exchanger 2.

An alternative embodiment of the present invention is described hereinbelow with reference to FIG. 12, which shows the air conditioning system according to this alternative embodiment.

Figure 12:
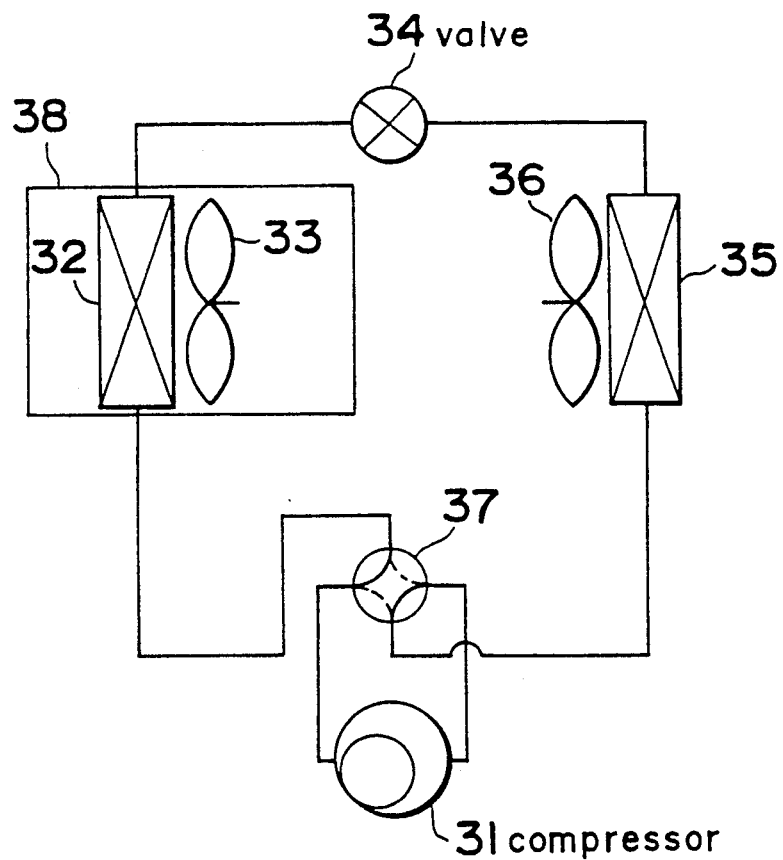
FIG. 12 is a diagram of an air conditioning system for an electric automobile according to an eighth embodiment of the present invention.

As shown in FIG. 12, this air conditioning system comprises a compressor 31, an outside air heat exchanger 32, an outside air heat exchanger fan 33, an expansion valve 34, an interior air heat exchanger 35, an interior air heat exchanger fan 36, a four-way switching valve 37, and an outside air induction/venting means 38 of the invention, which is provided outside the outside air heat exchanger 32. The coolant flow is the same in the invention as in the conventional apparatus described above, and a further description thereof has been omitted below.

It is necessary for all of the components to feature a high efficiency, low power consumption design because of the limited capacity of the battery in an electrically powered motor vehicle.

Figure 13:
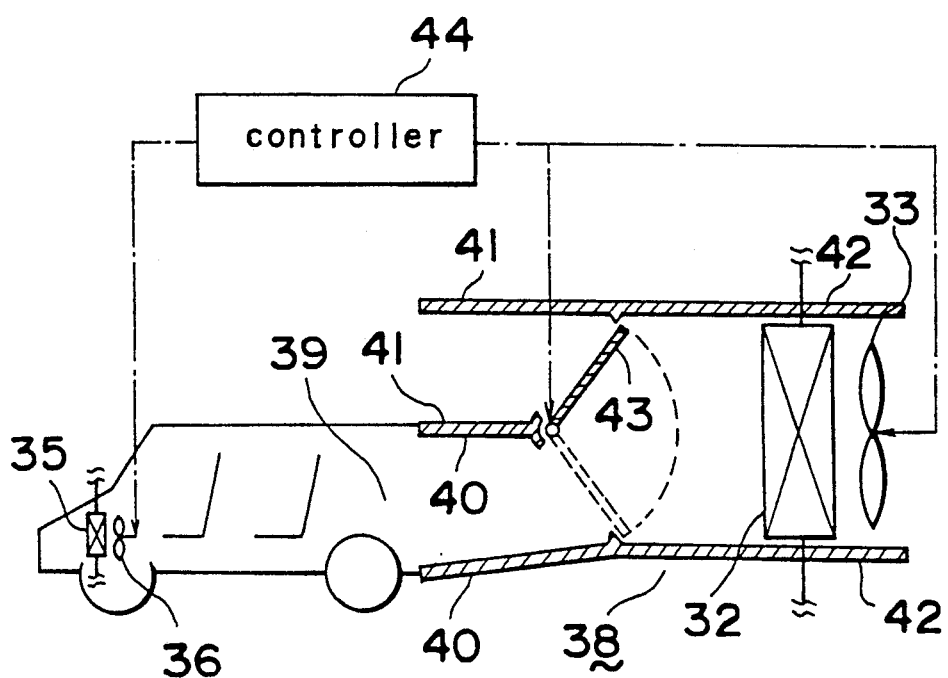
FIG. 13 is a diagram of the outside air induction device for the air conditioning apparatus of an electrically-powered motor vehicle according to a ninth embodiment of the present invention.

FIG. 13 is a cross-section of the outside air induction/venting means 38 used in the system shown in FIG. 12.

As shown in FIG. 13, an air vent duct 40 is provided to intake the vented air from the passenger compartment air vent 39. The other intake duct 41 parallel to the air vent duct 40 intakes air directly from the outside. Both intake ducts 40 and 41 are connected so that the air from both flows into a common duct 42. A damper 43 is placed at the connection of the three ducts 40, 41, and 42 to control the flow of air from either air vent duct 40 or outside air intake duct 41 into the common duct 42. The outside air heat exchanger 32 and the outside air heat exchanger fan 33 are placed inside the common duct 42 of the outside air induction/venting means 38, and a control device 44 is provided to control operation of the damper 43, outside air heat exchanger fan 33, and the interior air heat exchanger fan 36 according to the air conditioning mode.

The damper 43 is positioned as shown in FIG. 13 in the outside air induction/venting means 38 so that the heat of the air from the passenger compartment vented through the passenger compartment air vent 39 is introduced to the outside air heat exchanger 32 in the heating mode. During the cooling mode, the damper 43 is switched to the position indicated by the dotted line in FIG. 13 so that the outside air is introduced directly to the outside air heat exchanger 32. In addition, by switching the damper 43 to the (solid line) position shown in FIG. 13 during the heating mode defrost cycle and stopping the fans 33 and 36 for both the interior and outside air heat exchangers, outside air can be prevented from blowing across the outside air heat exchanger. By thus changing the position of the damper 43 and the operation of the fans 33 and 36 for both the interior and outside air heat exchangers according to the air conditioning mode, waste heat from inside the passenger compartment can be used in the heating mode to improve heating capacity and efficiency, and decreased cooling capacity and efficiency can be prevented in the cooling mode by intaking air directly from outside the vehicle. Furthermore, the outside air heat exchanger 32 is prevented from exchanging heat with the outside air, and a defrost cycle in the heat pump heating mode can be provided because induction of outside air to the outside air heat exchanger 32 can be prevented during vehicle travel by closing the damper 43.

It is also possible to position the damper 43 so that both outside air and air vented from the passenger compartment are ducted to the outside air heat exchanger 32 for an increased air flow.

An alternative embodiment of the present invention is described hereinbelow with reference to FIG. 14, a cross section of the outside air induction/venting means 38 according to this alternative embodiment.

Figure 14:
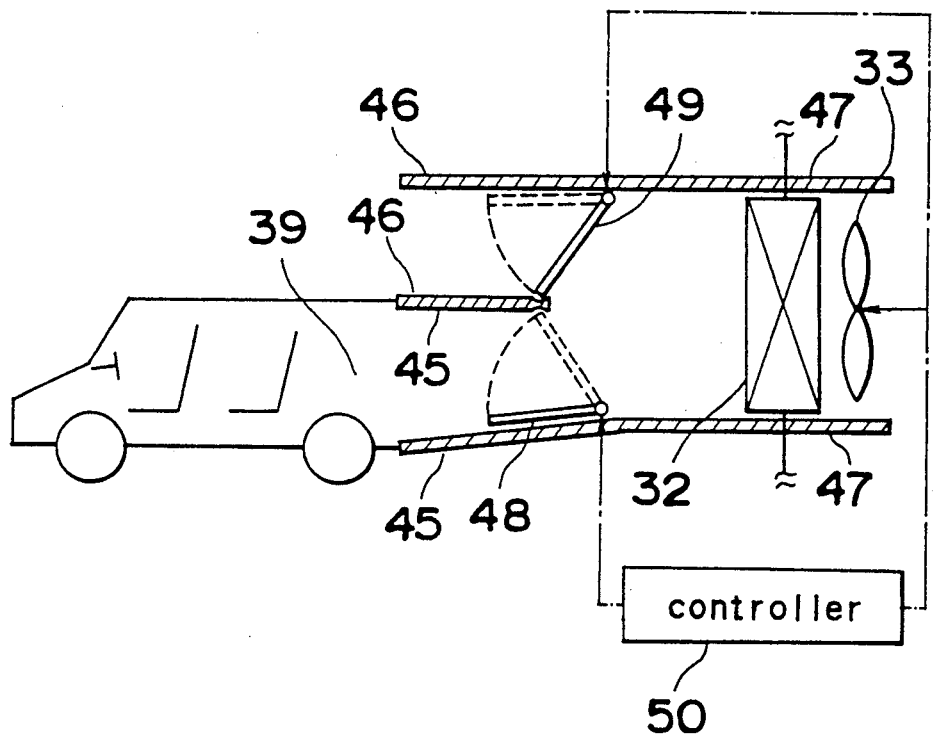
FIG. 14 is a diagram of the outside air induction device for the air conditioning apparatus of an electrically-powered motor vehicle according to a tenth embodiment of the present invention.

As shown in FIG. 14, an air vent duct 45 is provided to intake the vented air from the passenger compartment air vent 39. The other intake duct 46 parallel to the air vent duct 45 intakes air directly from the outside. Both intake ducts 45 and 46 are connected so that the air from both flows into a common duct 47. Separate dampers 48 and 49 are between the common duct 47 and air vent duct 45 and outside air intake duct 46, respectively, to control the flow of air from the two ducts 45 and 46 into the common duct 47 and the outside air heat exchanger 32. The outside air heat exchanger 32 and the outside air heat exchanger fan 33 are placed inside the common duct 47 of the outside air induction/venting means 38, and a control device 50 is provided to control operation of the dampers 48 and 49, and outside air heat exchanger fan 33 according to the air conditioning mode.

With this outside air induction/venting means 38, damper 48 is closed and damper 49 is opened to allow the direct flow of outside air to the outside air heat exchanger 32 when operating in the cooling mode. When operating in the heating mode, damper 48 is opened and damper 49 is closed so that warm air from inside the passenger compartment and vented from the passenger compartment air vent 39 is introduced to the outside air heat exchanger 32. During the defrost cycle of the heating mode, both dampers 48 and 49 are closed and the outside air heat exchanger fan 33 is stopped to stop the flow of air to the outside air heat exchanger 32. By thus changing the position of the dampers and outside air heat exchanger fan 33 operation according to the air conditioning mode, warm air from inside the passenger compartment can be used in the heating mode to improve heating capacity and efficiency, and decreased cooling capacity and efficiency caused can be prevented in the cooling mode by intaking outside air. In addition, a defrost cycle can be enabled in the heating mode during normal vehicle travel because the flow of air into the outside air heat exchanger 32 can be stopped.

It is to be noted that the same effect can be obtained by substituting an aperture-like flow restrictor for the damper switch device to greatly restrict the air flow. It is also possible to position the dampers 48 and 49 so that both outside air and air vented from the passenger compartment are ducted to the outside air heat exchanger 32 for an increased air flow.

An alternative embodiment of the present invention is described hereinbelow with reference to FIG. 15, a cross-section of the outside air induction/venting means 38 according to this alternative embodiment.

Figure 15:
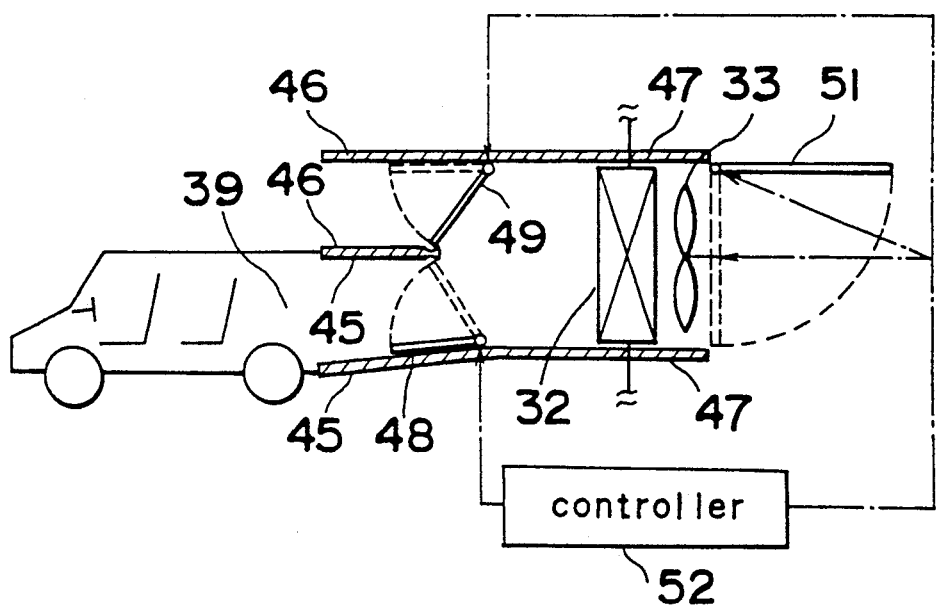
FIG. 15 is a diagram of the outside air induction device for the air conditioning apparatus of an electrically-powered motor vehicle according to a seventh embodiment of the present invention.

The outside air heat exchanger 32, outside air heat exchanger fan 33, passenger compartment air vent 39, air vent duct 45, outside air intake duct 46, common duct 47, and dampers 48 and 49 shown in FIG. 15 are the same as those shown in FIG. 14, and a further description thereof has been omitted.

This embodiment is characterized by a damper 51 provided in the duct 47 on the vent side of the outside air heat exchanger 32, and a control device 52 for controlling the opening and closing of the dampers 48, 49, and 51 and the operation of the outside air heat exchanger fan 33 according to the air conditioning mode.

With this outside air induction/venting means 8, damper 48 is closed and dampers 49 and 51 are opened to allow the direct flow of outside air to the outside air heat exchanger 32 when operating in the cooling mode. When operating in the heating mode, dampers 48 and 51 are opened and damper 49 is closed so that the air vented from the passenger compartment air vent 39 is introduced to the outside air heat exchanger 32. During the defrost cycle of the heating mode, dampers 48, 49, and 51 are closed and the outside air heat exchanger fan 33 is stopped. By thus changing the position of the dampers and outside air heat exchanger fan 33 operation according to the air conditioning mode, waste heat from the passenger compartment can be used in the heating mode to improve heating capacity and efficiency, and decreased cooling capacity and efficiency can be prevented in the cooling mode by directly intaking outside air. In addition, a defrost cycle can be enabled in the heating mode during normal vehicle travel because the flow of air into the outside air heat exchanger 32 can be stopped and any draw caused by drag behind the outside air heat exchanger 32 during vehicle travel can be blocked.

It is to be noted that this damper 51 is shown on the vent side of the outside air heat exchanger fan 33 in FIG. 15, but the same effect can be obtained by placing the damper 51 between the outside air heat exchanger 32 and the outside air heat exchanger fan 33.

The present invention enables the outside air heat exchanger to use waste heat from the drive shaft motor during the heat pump heating mode, and air from outside the vehicle during the cooling mode by selectively switching the air supply between two air ducts.

In addition, the flow of air from the front of the vehicle in motion can be stopped to the outside air heat exchanger, and an outside air heat exchanger defrost cycle can be achieved in the heat pump heating mode by opening and closing the air duct to the air intake of the outside air heat exchanger and stopping the outside air heat exchanger fan.

In addition, the outside air heat exchanger can use the waste heat of the drive shaft motor during the heat pump heating mode, can introduce fresh air from outside the vehicle in the cooling mode, and can enable a defrost cycle in the heat pump heating mode because the frontal air flow to the outside air heat exchanger can be stopped during vehicle travel by controlling the opening of the two air ducts and the operation of the outside air heat exchanger fan according to the operating mode of the air conditioning system.

In addition, by controlling the opening of the two air ducts and the operation of the outside air heat exchanger fan according to the operating mode of the air conditioning system and the temperature difference between the two temperature detection means, the outside air heat exchanger can use the higher temperature air duct during the heat pump heating mode, can use the lower temperature air duct in the cooling mode, and can adapt to a reversal of temperatures in the air ducts due to external conditions such as the radiant heat of the sun because the air duct selection is temperature controlled. In addition, when the temperature difference is below a predetermined threshold value such as when the vehicle is stopped, the two air ducts can be used to lower the resistance of the air duct and increase the air flow through the outside air heat exchanger. In addition, a defrost cycle can be enabled in the heat pump heating mode because the air flow to the front of the outside air heat exchanger can be stopped during vehicle travel.

In addition, a defrost cycle in the heat pump heating mode can be enabled during vehicle travel even when there is a draft behind the outside air heat exchanger because the supply of outside air to the outside air heat exchanger can be completely shut off by opening and closing the air ducts to the air intake and from the outlet of the outside air heat exchanger.

In addition, by controlling the opening of the three air ducts and the operation of the outside air heat exchanger fan according to the operating mode of the air conditioning system, the outside air heat exchanger can use the waste heat of the drive shaft motor during the heat pump heating mode, can introduce fresh air from outside the vehicle in the cooling mode, and can enable a defrost cycle in the heat pump heating mode even when there is a draft behind the outside air heat exchanger because the supply of outside air to the outside air heat exchanger can be completely shut off.

In addition, by controlling the opening of the three air ducts and the operation of the outside air heat exchanger fan according to the operating mode of the air conditioning system and the temperature difference between the two temperature detection means, the outside air heat exchanger can use the higher temperature air duct during the heat pump heating mode, can use the lower temperature air duct in the cooling mode, and can adapt to a reversal of temperatures in the air ducts due to external conditions such as the radiant heat of the sun because the air duct selection is temperature controlled. In addition, when the temperature difference is below a predetermined threshold value such as when the vehicle is stopped, two air ducts can be used to lower the resistance of the air duct and increase the air flow through the outside air heat exchanger. In addition, a defrost cycle can be enabled in the heat pump heating mode even when there is a draft behind the outside air heat exchanger because the supply of outside air to the outside air heat exchanger can be completely shut off.

In addition, the outside air heat exchanger can use the waste heat in the air vented from the passenger compartment during the heat pump heating mode, can directly intake outside air in the cooling mode, and a defrost cycle can be enabled in the heat pump heating mode because the air flow to the front of the outside air heat exchanger can be stopped during vehicle travel by controlling the switching of the two air ducts and the operation of the fans for the interior and outside air heat exchangers according to the operating mode of the air conditioning system.

In addition, the outside air heat exchanger can use the waste heat in the air vented from the passenger compartment during the heat pump heating mode, can directly intake outside air in the cooling mode, and a defrost cycle can be enabled in the heat pump heating mode because the air flow to the front of the outside air heat exchanger can be stopped during vehicle travel by controlling the opening of the two air ducts and the operation of the outside air heat exchanger fan according to the operating mode of the air conditioning system.

In addition, the outside air heat exchanger can use the waste heat in the air vented from the passenger compartment during the heat pump heating mode, can directly intake outside air in the cooling mode, and a defrost cycle can be enabled in the heat pump heating mode even when there is a draft behind the outside air heat exchanger because the supply of outside air to the outside air heat exchanger can be completely shut off by controlling the opening of the three air ducts and the operation of the outside air heat exchanger fan according to the operating mode of the air conditioning system.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An air conditioning apparatus for an electrically-powered motor vehicle comprising:
    a heat pump heating and cooling system including a compressor, an outside air heat exchanger, an outside air heat exchanger fan, an expansion valve, an interior air heat exchanger, an interior air heat exchanger fan, and a four-way selector valve;
    a first air duct enclosing a drive shaft motor for ducting air that has passed said drive shaft motor;
    a second air duct for direct ducting of outside air; and
    a switching means for switching between said two air ducts provided at an air intake of said outside air heat exchanger.

2. An air conditioning apparatus for an electrically-powered motor vehicle comprising:
    a heat pump heating and cooling system including a compressor, an outside air heat exchanger, an outside air heat exchanger fan, an expansion valve, an interior air heat exchanger, an interior air heat exchanger fan, and a four-way selector valve;
    and a switch device for opening and closing said air duct provided at said air intake of said outside air heat exchanger;
    wherein said switch device closes said ventilation circuit during a defrost operation in at least a warming mode, whereby air flow through said outside air heat exchanger is prevented, thereby shortening the time of the defrost operation.

3. An air conditioning apparatus for an electrically-powered motor vehicle comprising:
    a heat pump heating and cooling system including a compressor, an outside air heat exchanger, an outside air heat exchanger fan, an expansion valve, an interior air heat exchanger, an interior air heat exchanger fan, and a four-way selector valve;
    a first air duct enclosing a drive shaft motor for ducting air which has passed said drive shaft motor;
    a second air duct for direct ducting of outside air;
    a switch device provided at an air intake of said outside air heat exchanger for opening and closing said two air ducts; and
    a control device for operating said switch device and said outside air heat exchanger fan according to an air conditioning mode.

* * * * *